J. D. PALMER.
MILK AND CREAM SEPARATOR.
APPLICATION FILED OCT. 6, 1916.
1,240,360.
Patented Sept. 18, 1917.
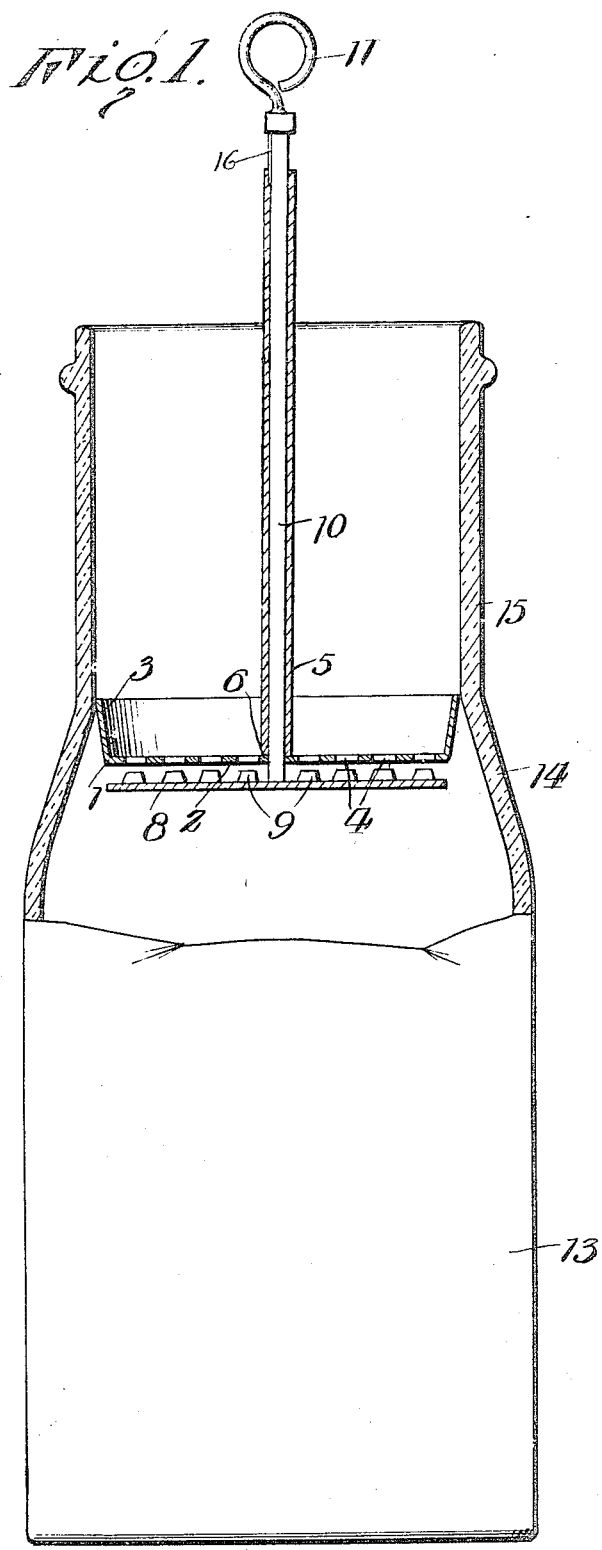
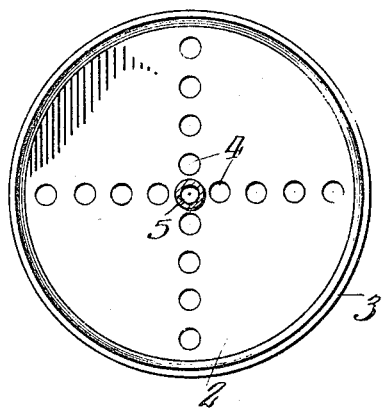
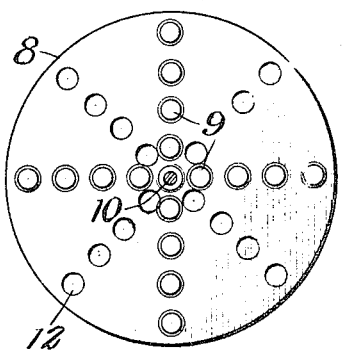
Jefferson D. Palmer
Inventor
By Geo. F. Kimmel
Attorney

UNITED STATES PATENT OFFICE.

JEFFERSON D. PALMER, OF WARRENTON, NORTH CAROLINA.

MILK AND CREAM SEPARATOR.

1,240,360. Specification of Letters Patent. Patented Sept. 18, 1917.

Application filed October 6, 1916. Serial No. 124,099.

*To all whom it may concern:*

Be it known that I, JEFFERSON D. PALMER, a citizen of the United States, and resident of Warrenton, in the county of Warren and State of North Carolina, have invented certain new and useful Improvements in Milk and Cream Separators, of which the following is a specification.

The present invention relates to the class of dairy and has particular reference to new and useful improvements in milk and cream separators.

The primary object of my invention is to provide a milk and cream separator having a novel and simple structure which is cheap to manufacture, is effective in use and absolutely sanitary.

Another object of my invention is to provide a milk and cream separator of the class described which will accurately isolate the milk and cream in a container whereby the latter may be removed without disturbing the former.

A still further object of my invention is to provide a milk and cream separator which may be inserted into a container, manipulated to isolate the milk and cream and remain in position while the cream is being withdrawn.

Other objects and advantages to be derived from the use of my improved milk and cream separator will appear from the following detail description and the claims, taken with an inspection of the accompanying drawing, in which:

Figure 1 is a vertical sectional view of a container, showing a milk and cream separator embodying the improvements of my invention in operative position;

Fig. 2 is a plan view of the separating cup; and

Fig. 3 is a similar view of the closure member for said cup.

Referring more particularly to the drawing, wherein similar characters of reference designate like and corresponding parts throughout the various views, 1 designates the separating cup, the same having a bottom 2 and a flaring annular side wall 3. The bottom 2 is provided with a plurality of radially alined apertures 4. A supporting tube 5 extends from the cup, said tube being fastened at 6 to the cup, preferably at the central portion thereof.

I provide a closure member for the perforations in the cup, said closure member consisting of a disk 8 provided on its upper face with a plurality of conical projections 9 arranged in radial alinement to conform with the openings 4. A rod 10 extends from the central portion of the disk 8, said tube 5 snugly embracing the rod 10, the latter being provided with a removable ring 11 on its upper free end. A plurality of openings 12 best shown in Fig. 3 are formed in the disk 8 radially arranged relatively alternately to the projections 9.

The receptacle or container in which the device of my invention is to be employed preferably conforms to the shape shown in Fig. 1 wherein the body is designated 13 and is reduced at 14 to form a neck 15, the latter being of an even diameter throughout its length. When inserted into the neck the flaring wall 3 of the cup snugly engages the inner peripheral surface of the neck preventing the passage of liquid between the wall 3 and the neck 15. A key 16 is formed on the upper portion of the rod 10 engageable in a complemental recess in the tube 5.

In use the device of my invention is inserted into the receptacle 13 to the bottom of the same, and then raised until in alinement with the dividing line between the milk and cream. The disk 8 is then moved to the closed position. When inserting the cup the disk 8 must be in the position as shown in Fig. 1 so as to permit milk to pass through the cup in order that the latter may reach the desired depth. The ring 11 is then grasped and the cream withdrawn, the openings being closed by the engagement of projections therewith. By holding the cup in this position the cream may be poured from the container without disturbing the milk. None of the cream can escape because of the snug engagement of the cup peripherally with the inner face of the neck 15. Thus it will be seen that in the provision of my improved milk and cream separator I have afforded a novel and simple device for this purpose which may be cheaply manufactured, easily operated and is absolutely sanitary.

From the above description taken in connection with the accompanying drawing, it is thought that a clear and comprehensive understanding of the construction, operation and advantages of my invention may be had, and while I have shown and described the device as embodying a specific structure, I desire that it be understood that such changes may be made in said structure as do not depart from the spirit and scope of the invention as claimed.

Having thus fully described my invention, what I claim as new and desire to secure by Letters Patent, is:—

1. A milk and cream separator including a cup having a regularly perforated bottom and a flaring annular wall, a tube extending from the central portion of said cup, a disk, a rod mounted in said tube connected with the disk to move the latter, and a plurality of regularly arranged conical enlargements on said disk for engagement with said perforations in the cup.

2. In a milk and cream separator, the combination of a cup having a regularly perforated bottom and a flaring annular wall, a tube extending from said cup, a disk, a rod operable in said tube connecting with said disk, said disk being provided with a plurality of regularly arranged conical enlargements for engagement in said perforations, and a key carried by the rod engageable in a complemental recess in said tube to prevent relative rotation of said disk and said cup.

In testimony whereof, I affix my signature hereto.

JEFFERSON D. PALMER.